United States Patent
Abusleme et al.

(10) Patent No.: US 6,476,150 B1
(45) Date of Patent: *Nov. 5, 2002

(54) CROSSLINKABLE MODIFIED FLUORINATED POLYMERS

(75) Inventors: Julio A. Abusleme, Varese (IT); Giambattista Besana, Como (IT); Giandomenico Vita, Como (IT)

(73) Assignee: Ausimont S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,198

(22) Filed: Mar. 17, 2000

(30) Foreign Application Priority Data

Mar. 19, 1999 (IT) .......................... MI99A0549

(51) Int. Cl.7 ............................ C08J 3/24; C08L 23/08; C08L 23/26; C08L 27/12; C08L 27/22
(52) U.S. Cl. ...................... 525/276; 525/278; 525/279; 525/281; 525/293; 525/304; 525/326.3; 525/375; 525/382; 525/384
(58) Field of Search .................... 525/326.3, 375, 525/276, 278, 279, 281, 293, 304, 384, 382

(56) References Cited

U.S. PATENT DOCUMENTS

| | | | |
|---|---|---|---|
| 3,763,222 A | 10/1973 | Aronoff et al. | 260/475 |
| 3,840,619 A | 10/1974 | Aronoff et al. | 260/878 |
| 4,039,631 A | 8/1977 | Robertson et al. | 260/878 |
| 4,121,001 A | 10/1978 | Gotcher et al. | 428/35 |
| 5,395,886 A * | 3/1995 | Caporiccio et al. | 525/326.3 |
| 5,612,419 A | 3/1997 | Arcella et al. | 525/252 |
| 6,107,393 A * | 8/2000 | Abusleme et al. | 524/545 |

FOREIGN PATENT DOCUMENTS

| | | |
|---|---|---|
| FR | 2 494 702 | 5/1992 |
| JP | 05-8353 | * 1/1993 |

OTHER PUBLICATIONS

Derwent Publications Ltd., London, GB; AN 1993–061386; XP–002141967 (JP 05 008353).

Derwent Publications Ltd., London, GB; AN 1990–187904; XP–002141968 (JP 02 121206).

Derwent Publications Ltd., London, GB; AN 1995–101909; XP–002141969 (JP 07 025954).

* cited by examiner

Primary Examiner—D. R. Wilson
(74) Attorney, Agent, or Firm—Arent Fox Kintner Plotkin & Kahn

(57) ABSTRACT

The present invention is related to melt-processable thermally crosslinkable compositions consisting of I) thermoprocessable copolymers of ethylene (E) with tetrafluoroethylene (TFE) and/or chlorotrifluoroethylene (CTFE), and acrylic monomers of formula $CH_2=CH-CO-O-R_2$ (a); and II) one or more crosslinking agents.

11 Claims, No Drawings

CROSSLINKABLE MODIFIED FLUORINATED POLYMERS

The present invention relates to crosslinked fluorinated polymers modified with hydrogenated monomers, the processes for their preparation and the manufactured articles therefrom.

In particular the invention relates to melt-processable curable compositions, comprising thermoprocessable copolymers of ethylene (E) with tetrafluoroethylene (TFE) and/or chlorotrifluoroethylene (CTFE) modified with acrylic monomers, which subjected to thermal treatment improve their mechanical properties at high temperatures and chemical resistance, increasing their rating. Said crosslinkable compositions adhere to hydrogenated polymers.

The improvement of the mechanical properties at high temperatures is shown by the increase of the stress at break without jeopardizing the elongation at break.

The use of hydrogenated polymers in the car industry for preparing fuel hoses and fuel lines is known in the prior art. Examples of hydrogenated polymers are polyamides, polyvinylchloride (PVC), nitrile rubbers (NBR). The drawbacks of the manufactured articles obtained therefrom are the low chemical resistance and high permeability to gasolines and oils, in particular SF® oils which show high aggressivity towards the vinylidene fluoride (VDF)-based elastomers, presently used in the car industry. A high permeability to there fluids, in particular gasolines, implies a high emission of dangerous substances to the environment. The laws of most countries are more and more restrictive on these emissions due to their environmental impact. Therefore, materials having a lower permeability, improved chemical resistance and at the same time having improved mechanical properties at high temperatures, in particular stress at break, are required.

Fluorinated polymers having an improved chemical resistance to gasolines and to particularly aggressive oils used in the car industry in comparison with hydrogenated polymers, are known. Besides, said fluorinated polymers have a combination of mechanical properties which make them suitable for the above mentioned uses. The drawback of these fluorinated polymers is the high cost which limits their use.

In order to make economically possible the use of fluorinated polymers it has been suggested the use of composites of hydrogenated polymers with fluorinated polymers. However the adhesion between fluorinated polymers and hydrogenated polymers is very poor. The research is directed to find solutions such as to make possible these composites. In particular for the thermoprocessable fluorinated of ethylene (E) copolymers with tetrafluoroethylene (TFE) and/or chlorotrifluoroethylene (CTFE), for example Halar® commercialized by Ausimont USA Inc., the solutions suggested for their coupling with hydrogenated polymers, use adhesives of various types. In this case the technologies for obtaining multilaminates from the industrial point of view are more complex for the introduction of an additional adhesive layer (tie-layer technology).

The need was felt to make multi-layer manufactured articles, made of hydrogenated and fluorinated polymers having improved mechanical properties, impermeability and chemical resistance to liquid fuels without using the tie-layer technology. Among the most known applications of multi-layer manufactured articles, fuel hoses (hydrogenated rubbers/fluorinated polymers) and fuel lines (polyamides/fluorinated polymers) can be mentioned.

The Applicant has surprisingly and unexpectedly found melt-processable curable compositions comprising: thermoprocessable copolymers of ethylene (E) with tetrafluoroethylene (TFE) and/or chlorotrifluoroethylene (CTFE) modified with acrylic monomers and a cross-linking agent, which subjected to thermal treatment are capable to crosslink, improving their mechanical and chemical resistance properties, showing adhesive properties with hydrogenated polymers.

An object of the present invention are therefore melt-processable thermally crosslinkable compositions comprising:

I) thermoprocessable copolymers of ethylene (E) with tetrafluoroethylene (TFE) and/or chlorotrifluoroethylene (CTFE) modified with acrylic monomers of formula:

$$CH_2=CH-CO-O-R_2 \qquad (a)$$

$R_2$ is an hydrogenated radical from 1 to 20 carbon atoms, $C_1-C_{20}$, alklyl, linear and/or branched radical, or cycloalkyl, or $R_2$ is H. The radical $R_2$ can optionally contain: heteroatoms preferably Cl, O, N; one or more functional groups preferably selected from OH, COOH, epoxide, ester and ether; and double bonds; the above n is an integer in the range 0–10.

II) one or more cross-linking agents.

The thermoprocessable copolymers of the present invention composition comprise from 10 to 70%, preferably from 35 to 55%, by moles of ethylene, from 30 to 90%, preferably from 45 to 65%, by moles of a fluorinated monomer selected from tetrafluoroethylene, chlorotrifluoroethylene, or mixtures thereof, from 0.1 to 30%, preferably from 1 to 15% by moles of the comonomer (a).

As component I), thermoprocessable copolymers wherein the fluorinated monomer is chlorotrifluoroethylene are preferred. n-Butylacrylate (n-BuA) is the preferred acrylic monomer.

The cross-linking agents can be active by radical way, such as for example The cross-linking agents can be active by radical way, such as for example traallylisocyanurate (TAIC), triallylcyanurate (TAC), diallylisophthalate (U.S. Pat. No. 4,039,631), diallylterephthalate (U.S. Pat. No. 4,039,631,), esters of phenylindan dicarboxylic acids (U.S. Pat. No. 3,763,222), triallyl esters of aryl polycarboxylic acids (U.S. Pat. No. 3,840,619), bis-olefins such as for example 1,6 divinylperfluorohexane (see U.S. Pat. No. 5,612,419) and others (see U.S. Pat. No. 4,121,001); or active by ionic way such as for example hexamethylendi-aminecarbamate (DIAK 1), N,N'-dicinnamylidene-1,6-hexanediamine (DIAK 3), maleimide derivatives such as for example m-phenylenebismaleimide, $C_4-C_{20}$ aliphatic diamines, polyhydroxyl aromatic compounds for example bisphenols A, AF and S. As crosslinking agents active by radical way triallylisocyanurate is preferred. As crosslinking agents active by ionic route aliphatic and aromatic diamines are preferred.

The cross-linking agent amounts ranges from 0.1 to 20.0% by weight, preferably from 0.5 to 10.0%, more preferably from 1.0 to 5.0%.

The crosslinkable melt-processable compositions can furthermore contain one or more optional ingredients such as fillers (for example polytetrafluoroethylene (PTFE), silicates), smoke retarders, lubricants, pigments, fire retardants, intumescent agents, plasticizers (for example MORFLEX® 560), metal oxides (ZnO, MgO), inorganic bases (Ca(OH)$_2$), tetraalkyl ammonium or phosphonium salts, thermal stabilizers such as for example Irganox® 1010 and peroxides used in crosslinking processes known in the prior art, for example Luperco® 101 XL (2,5-dimethyl-2,5-di(terbutylperoxy)hexane 45% by weight on inert support), dicumylperoxide.

The maximum total amount of the optional components is 30.0% by weight.

The composition of the present invention is obtainable by closely mixing the ethylene thermoprocessable copolymers with tetrafluoroethylene (TFE) and/or chlorotrifluoroethylene (CTFE) modified with acrylic monomers, with one or more crosslinking agents. Alternatively, the composition of the present invention can be obtained by homogeneously distributing one or more crosslinking agents on a manufactured article of thermoprocessable copolymers of ethylene with tetrafluoroethylene (TFE) and/or chlorotrifluoroethylene (CTFE) modified with acrylic monomers, or by contacting the surfaces of said manufactured article with a hydrogenated polymer containing one or more crosslinking agents.

A further object of the present invention is a crosslinking process consisting of subjecting the melt-processable crosslinkable compositions of the present invention, to a thermal treatment.

Such a process is carried out at a temperature generally higher than 15 °C. When the crosslinking agents are activated by ionic way, the process is carried out at temperature preferably lower than 200° C. When the crosslinking agents are activated by radical way, the process is carried out at a temperature preferably higher than 250° C.

For a given composition of the invention, the time of the thermal treatment decreases as the chosen temperature for the crosslinking increases.

A further object of the present invention are the manufactured articles obtained by crosslinking the melt-processable compositions of the present invention.

A further object of the invention are multi-layer manufactured articles of hydrogenated polymers and melt-processable crosslinkable compositions of the invention, thermally treated and untreated. The preferred manufactured articles are: fuel lines, obtainable for example by coextrusion of polyamide and the compositions of the invention; fuel hoses, obtainable for example by extrusion of hydrogenated rubber on a tube made of the compositions of the invention.

As hydrogenated polymers we can mention thermoplastics and elastomers. As thermoplastic polymers: for example cellulose polymers, polyamides such as NYLON 6, NYLON 66, NYLON 11, NYLON 12, polyamide copolymers, polycarbonates, polyesters, such as polyethylenterephthalate, polyester copolymers, polyolefins such as high and low density polyethylene, olefine copolymers, polyimides, polystyrene, polyurethanes, polyvinylchloride (PVC), polysulphones, ethylene/vinylacetate copolymers, polyacrylbutadienestyrene (ABS). The preferred thermoplastic hydrogenated polymers are polyesters, polyolefins, polyamides.

As hydrogenated elastomers we can mention acrylic rubbers, nitrile rubbers (NBR), ethylene-propylene rubbers (EPM), ethylene-propylene-diene rubbers (EPDM), NVC rubbers (nitrile NBR rubbers mixed with PVC), epichlorohydrin rubbers (CO and ECO).

As hydrogenated elastomers, epichlorohydrin and nitrile rubbers (NBR) are preferred.

Some examples of the present invention are hereinafter reported, the purpose of which is merely illustrative but not limitative of the scope of the invention itself.

EXAMPLE 1

1.1—Preparation of the "Polymer A" (E/CTFE/n-BuA 40/55/5 Moles %)

In an enamelled autoclave equipped with baffles and stirrer working at 450 rpm in Hastelloy C, 5.3 l of demineralized water, 1.7 l of methyl alcohol, 20 ml of methylcyclopentane, 10 g of n-butylacrylate and 2 kg of chlorotrifluoroethylene were introduced. The autoclave was then heated to the reaction temperature of 15° C. and ethylene was fed up to a pressure of 8.2 absolute bar. In the autoclave the radical initiator was then continuously fed during the polymerization under the form of a trichloroacetylperoxide (TCAP) solution in isooctane, maintained at −17° C., having a titre equal to 0.1 g TCAP/ml. Furthermore, 10 g of n-butylacrylate were fed at consumption of 20, 40, 60, 80, 100, 120, 140, 160 and 180 g of ethylene.

The pressure was maintained constant during the polymerization by continuously feeding ethylene to the reactor up to a consumption of 200 g; in total 399 ml of initiator solution were introduced. The polymerization lasted 555 minutes.

The product discharged from the autoclave was dried at 120° C. for about 16 hours. The amount of the obtained dry product was 1200 g. The obtained product is defined "Polymer A".

The mechanical properties at 120° C., obtained according to the ASTM D1708 method by using compression molded specimens of the polymer A, are reported in Table 1.

1.2—Preparation of the "Polymer A'": Polymer A+TAIC 5% by Weight

The polymer A was added with TAIC at 5% by weight and optional components such as MARK-260® in an amount of 0.45% by weight and Aclyn-316® in an amount of 0.15% by weight, both mainly used as thermal stabilizers.

The obtained polymer, defined "Polymer A'", is pelletized at a maximum temperature of 240° C., in a single screw Brabender extruder of Hastelloy C-276 having a 18 mm diameter and a length equivalent to 25 times the diameter.

1.3—"Thermal Crosslinking"

The Polymer A' was compression molded at 240° C. for 8 minutes at 40 bar obtaining specimens having a 0.3 mm thickness. One specimen is thermally treated at 275° C. for 18 minutes and another one under the same conditions for 25 minutes.

The mechanical properties at 120° C., obtained according to the ASTM D1708 method, of the above mentioned specimens, are reported in Table 1.

1.4—Permeability to "Fuel C" (Isooctane-toluene 50/50) at 50° C.

The permeability at 50° C. is measured in grams of solvent (Fuel C) per surface area of the specimen in function of time.

The permeability ratios between the specimens of polymer A and of the polymer A' thermally treated at 275° C. for 25 minutes in function of time are: at 3 hours 1.85; at 6 hours 1.45; at 24 hours 1.47; at 48 hours 1.48.

These ratios show how the polymer A' according to the present invention permeates at least 50% less than polymer A.

EXAMPLE 2

Comparative 2.1—Preparation of the "Polymer B" (E/CTFE 49/51 Moles %)

In an enamelled autoclave equipped with baffle and stirrer working at 450 rpm in Hastelloy C, 5.3 l of demineralized water, 1.7 l of methyl alcohol, 52 ml of methylcyclopentane and 2 kg of chlorotrifluoroethylene were introduced. The autoclave was then heated to the reaction temperature of 15° C. and ethylene was introduced up to a pressure of 12.6 absolute bar. In the autoclave the radical initiator was then continuously fed during the polymerization under the form of a trichloroacetylperoxide (TCAP) solution in isooctane, maintained at −17° C., having a titre equal to 0.12 g TCAP/ml.

The pressure was maintained constant during the polymerization by continuously feeding ethylene into the reactor up to a consumption of 200 g; in total 200 ml of initiator solution were introduced.

The product discharged from the autoclave was dried at 120° C. for about 16 hours. The amount of the obtained dry product was 1507 g. The obtained product is defined "Polymer B".

The mechanical properties at 120° C. obtained according to the ASTM D1708 method by using compression molded specimens of the polymer B are reported in Table 2.

2.2—Preparation of the "Polymer B'": "Polymer B"+TAIC 5% by Weight

The polymer B was added with TAIC at 5% by weight and optional components such as MARK-260® in an amount of 0.45% by weight and Aclyn-316® in an amount of 0.15% by weight, both mainly used as thermal stabilizers.

The obtained polymer, defined "Polymer B'", is pelletized at a maximum temperature of 270° C. in a single screw Brabender extruder of Hastelloy C-276 having a 18 mm diameter and a length equivalent to 25 times the diameter.

2.3—"Thermal Crosslinking"

The Polymer B' was compression molded at 260° C. for 8 minutes at 40 bar obtaining specimens having a 0.3 mm thickness. One specimen is thermally treated at 275° C. for 18 minutes and another one under the same conditions for 25 minutes.

The mechanical properties at 120° C., obtained according to the ASTM D1708 method of the above mentioned specimen, are reported in Table 1.

From Table 1 it is observed a substantial improvement of the stress at break at high temperature of the thermally treated composition object of the present invention, based on the polymer A, even maintaining an elongation at break higher than 100%, in comparison with the untreated polymer A.

From Table 2 no improvement is observed in the stress at break at high temperature of the thermally treated composition based on polymer B, in comparison to the untreated polymer B.

It is therefore evident from the comparison between the two Tables that the presence of the formula (a) comonomer in the thermoplastic fluorinated copolymer of the composition object of the present invention is essential.

EXAMPLE 3

3.1—Formulation of the Epichlorohydrin Rubber. "Polymer C"

400 g of epichlorohydrin are loaded in a two-rolls open mixer (Φ=150 mm, L=300 mm) and formulated as follows:

| Rubber: | |
|---|---|
| Hydrin ® C | 50 phr. |
| Hydrin ® T | 50 phr. |
| Span ® 60 | 3 phr. |

| -continued | |
|---|---|
| Carbon Black: | |
| SFR | 20 phr. |
| FEF 550N | 30 phr. |
| Ultrasil VN 3 (precipitated silica) | 10 phr. |
| NBC (nickel dibutyldithiocarbamate) | 1 phr. |
| Thiokol TP 95 (di (butoxy-ethoxy-ethyl) adipate) | 8 phr. |
| Maglite Y (MgO having low activity) | 15 phr. |
| MB/MB1 (mercaptobenzoimidazol) | 1 phr. |
| CBS (N-cyclohexylbenzothiazolsulphenamide) | 1 phr. |
| DIAK 1 | 2 phr. |
| DC 40 (dicumylperoxide) | 3 phr. |
| Diphenylguanidine | 5 phr. |
| Polyhydroxyl aromatic compounds in powder | 2.1 phr. |
| Accelerant (diphenyl-benzyl-N,N-diethyl-aminophosphonium chloride) | 0.7 phr. |

Subsequently they are processed in the mixer according to the ASTM D-3182 method. The obtained product is defined "Polymer C".

3.2—Polymer A/polymer C Bi-layer Preparation

Polymer C is distributed on the exposed surface of a sheet of polymer A placed in a mold having a rectangular cavity, and kept under pressure for 10 minutes at 170° C.

The peeling force between the two layers of polymer A and polymer C was measured with a dynamometer. Such force is of 0.9 N/mm.

This is an example wherein the composition according to the present invention is formed in the contact zone between the surfaces of polymer A (component I of the invention composition) and of polymer C (containing the components II of the invention composition).

EXAMPLE 4

Polymer A'/Polymer C Bi-layer Preparation

Example 3 was repeated by replacing the polymer A with polymer A'. The peeling force is 1.2 N/mm.

EXAMPLE 5

Comparative

Polymer B/Polymer C Bi-layer Preparation

Example 3 was repeated by replacing the polymer A with polymer B. There is no adhesion.

In the contact zone between the two polymer surfaces the invention composition is not formed.

EXAMPLE 6

Polyamide 12 hereinafter defined "Polymer D" was used.

6.1—Preparation of the "Polymer D'": Polymer D+TAIC 5% by Weight

The polymer D was added with TAIC at 5% by weight and pelletized in a single screw Brabender extruder of Hastelloy C-276 having a diameter of 18 mm and a length equivalent to 25 times the diameter. The obtained polymer is defined "Polymer D'".

6.2—Polymer A/Polymer D' Bi-layer Preparation

In a mold having a rectangular cavity a sheet of polymer A and a sheet of polymer D' are placed and then the whole is maintained under pressure for 9 minutes at 260° C.

In this case the peeling force between the two layers of polymer A and polymer D' is about 1 N/mm.

EXAMPLE 7

Example 6 was repeated by replacing the polymer A with polymer A' and polymer D' with polymer D. The peeling force is analogous to the previous Example.

EXAMPLE 8

Comparative

Example 6 was repeated by replacing the polymer D' with polymer D. There is no adhesion.

TABLE 1

| Mechanical properties at 120° C. | Polymer A | Polymer A' (treated for 18') | Polymer A' (treated for 25') |
|---|---|---|---|
| Elastic modulus (MPa) | 7 | 9.8 | 6.7 |
| Yield Stress (MPa) | 1.1 | 1.2 | 1.2 |
| Elongation at break (%) | 724 | 309 | 199 |
| Stress at break (MPa) | 1.7 | 3.8 | 3.0 |
| % variation of stress at break | — | 123.5 | 76.5 |
| % variation of elongation at break | — | −57.3 | −72.5 |

TABLE 2

| Mechanical properties at 120° C. | Polymer B | Polymer B' (treated for 18') | Polymer B' (treated for 25') |
|---|---|---|---|
| Elastic modulus (MPa) | 140 | 175 | 145 |
| Yield Stress (MPa) | 5.9 | 5.6 | 5.3 |
| Elongation at break (%) | 799 | 550 | 600 |
| Stress at break (MPa) | 9.8 | 6.8 | 10.2 |
| % variation of stress at break | — | −30.6 | 4.1 |
| % variation of elongation at break | — | −31.2 | −24.9 |

What is claimed is:

1. Melt-processable thermally crosslinkable compositions consisting of:

I) thermoprocessable copolymers of ethylene (E), tetrafluoroethylene (TFE) and/or chlorotrifluoroethylene (CTFE), and acrylic monomers of formula:

$$CH_2=CH-CO-O-R_2 \qquad (a)$$

wherein $R_2$ is selected from the group consisting of H; linear and/or branched alkyl radicals having from 1 to 20 carbon atoms; cycloalkyl radicals having from 1 to 20 carbon atoms; and substituted alkyl radicals having from 1 to 20 carbon atoms containing Cl, O, N, or one or more functional groups selected from the group consisting of OH, COOH, epoxide, ester, ether, and double bonds;

II) one or more cross-linking agents selected from the group consisting of triallylisocyanurate (TAIC), triallylcyanurate (TAC), diallyl isophthalate, diallyl terephthalate, esters of phenylindan dicarboxylic acids, triallyl esters of aryl polycarboxylic acids, 1,6 divinylperfluorohexane, hexamethylendiaminecarbamate (DIAK 1), N,N'-dicinnamylidene-1,6-hexanediamine (DIAK 3), m-phenylenbismaleimide, $C_4$–$C_{20}$ aliphatic diamines, and bisphenols A, AF and S.

2. Compositions according to claim 1 wherein the thermoprocessable copolymers consist of from 10 to 70% by moles of ethylene, from 30 to 90% by moles of tetrafluoroethylene, chlorotrifluoroethylene, or mixtures thereof, and from 0.1 to 30% by moles of the comonomer (a).

3. Compositions according to claim 2 characterized in that the components I) are thermoprocessable copolymers of ethylene (E), chlorotrifluoroethylene (CTFE), and acrylic monomer of formula (a).

4. Compositions according to claim 1 characterized in that the acrylic monomer of formula (a) is n-butyl acrylate.

5. Compositions according to claim 1 wherein the crosslinking agents are selected from the group consisting of triallylisocyanurate and aliphatic and aromatic diamines.

6. Compositions according to claim 1 characterized in that the cross-linking agent amounts are in the range 0.1–20.0% by weight, preferably 0.5–10.0% by weight, more preferably 1.0–5.0% by weight of the crosslinkable composition.

7. Compositions according to claim 1 obtained by mixing the thermoprocessable copolymers (I) with one or more crosslinking agents (II), or homogenously distributing one or more crosslinking agents on a manufactured article based on thermoprocessable copolymers (I).

8. A crosslinking process in which the compositions according to claim 1 are subjecting to thermal treatment.

9. A process according to claim 8 wherein the thermal treatment temperature is higher than 150° C.; when the crosslinking agents are active by an ionic route, the process is carried out at a temperature lower than 200° C., when the crosslinking agents are active by a radical route, the process is carried out at a temperature higher than 250° C.

10. The compositions of claim 1 which have been thermally crosslinked.

11. Manufactured articles obtained from the compositions according to claim 13.

* * * * *